(12) United States Patent
Freitag et al.

(10) Patent No.: US 11,881,236 B2
(45) Date of Patent: Jan. 23, 2024

(54) SPIN TORQUE OSCILLATOR WITH ENHANCED SPIN POLARIZER

(71) Applicant: Western Digital Technologies, Inc., San Jose, CA (US)

(72) Inventors: James Mac Freitag, Sunnyvale, CA (US); Susumu Okamura, San Jose, CA (US); Christian Kaiser, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/845,797

(22) Filed: Jun. 21, 2022

(65) Prior Publication Data

US 2023/0410841 A1   Dec. 21, 2023

(51) Int. Cl.
| | |
|---|---|
| *G11B 5/235* | (2006.01) |
| *G11B 5/31* | (2006.01) |
| *G11B 5/127* | (2006.01) |
| *G11B 5/00* | (2006.01) |

(52) U.S. Cl.
CPC .......... *G11B 5/3146* (2013.01); *G11B 5/1278* (2013.01); *G11B 5/235* (2013.01); *G11B 5/314* (2013.01); *G11B 5/3133* (2013.01); *G11B 5/3116* (2013.01); *G11B 2005/0024* (2013.01)

(58) Field of Classification Search
None
See application file for complete search history.

(56) References Cited

U.S. PATENT DOCUMENTS

| | | |
|---|---|---|
| 8,824,104 B1 | 9/2014 | Koui et al. |
| 9,047,888 B2 | 6/2015 | Katada et al. |
| 9,230,597 B2 | 1/2016 | Shimoto et al. |
| 10,566,015 B2 | 2/2020 | Freitag et al. |
| 10,643,643 B1 | 5/2020 | Gao et al. |
| 10,885,933 B2 | 1/2021 | Li et al. |

(Continued)

OTHER PUBLICATIONS

Bosu, S. et al., "Reduction of critical current density for out-of-plane mode oscillation in a mag-flip spin torque oscillator using highly spin-polarized Co2Fe(Ga0.5Ge0.5) spin injection layer", Feb. 2016, American Institute of Physics, <https://aip.scitation.org/doi/10.1063/1.4942373>.

(Continued)

*Primary Examiner* — Craig A. Renner
(74) *Attorney, Agent, or Firm* — PATTERSON + SHERIDAN, LLP; Steven H. VerSteeg

(57) ABSTRACT

The present disclosure generally relates to a magnetic recording head comprising a spintronic device. The spintronic device is disposed between a main pole and a trailing shield of the magnetic recording head. The spintronic device comprises a multilayer spacer layer comprising a Cu layer in contact with a spin torque layer and a spin transparent texture layer disposed on the Cu layer, the spin transparent texture layer comprising AgSn or AgZn. A multilayer notch comprising a CoFe layer is disposed over the spin transparent texture layer of the multilayer spacer layer and a Heusler alloy layer is disposed on the CoFe layer, the Heusler alloy layer comprising CoMnGe, CoFeGe, or CoFeMnGe. The multilayer spacer layer and the multilayer notch result in the spintronic device having a high spin polarization and a reduced critical current.

22 Claims, 10 Drawing Sheets

(56) References Cited

U.S. PATENT DOCUMENTS

| | | |
|---|---|---|
| 11,264,052 B1 | 3/2022 | Song et al. |
| 11,289,118 B1 | 3/2022 | Kaiser et al. |
| 2015/0124347 A1* | 5/2015 | Shimoto et al. ....... G11B 5/314 |
| | | 360/71 |
| 2017/0309299 A1 | 10/2017 | Tang et al. |
| 2022/0148619 A1 | 5/2022 | Freitag et al. |
| 2023/0030248 A1* | 2/2023 | Okamura et al. .... G11B 5/3909 |

OTHER PUBLICATIONS

Huang, H.B. et al., "Modelling high-power spin-torque oscillator with perpendicular magnetization in half-metallic Heusler alloy spin valve nanopillar", Feb. 2014, Journal of Alloys and Compounds, pp. 230-235, <https://www.sciencedirect.com/science/article/abs/pii/S0925838814003065?via%3Dihub>.

* cited by examiner

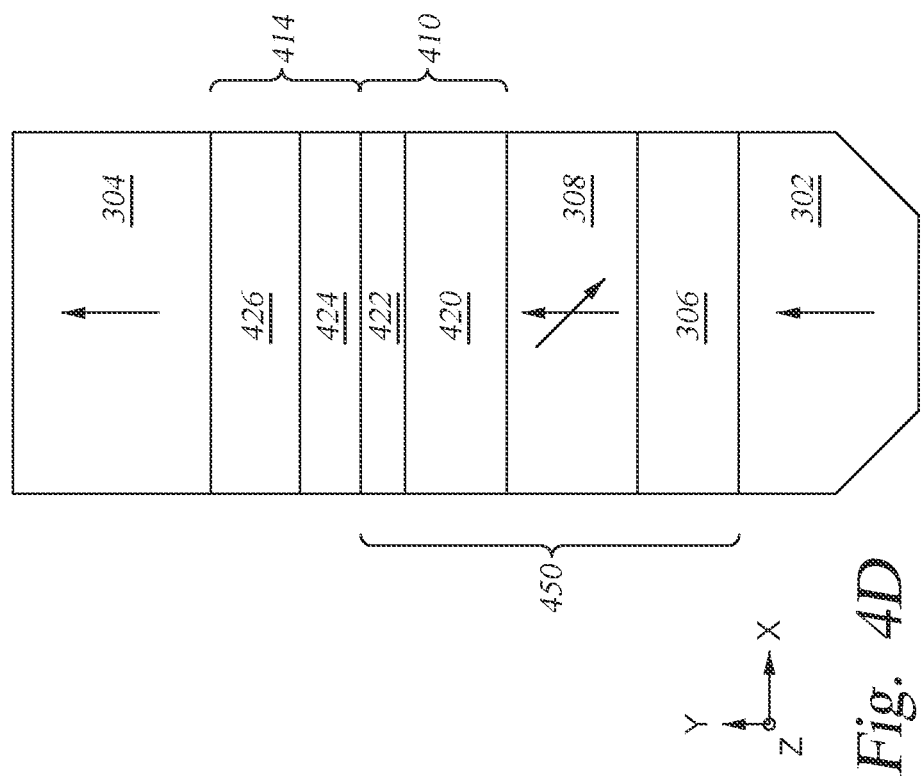
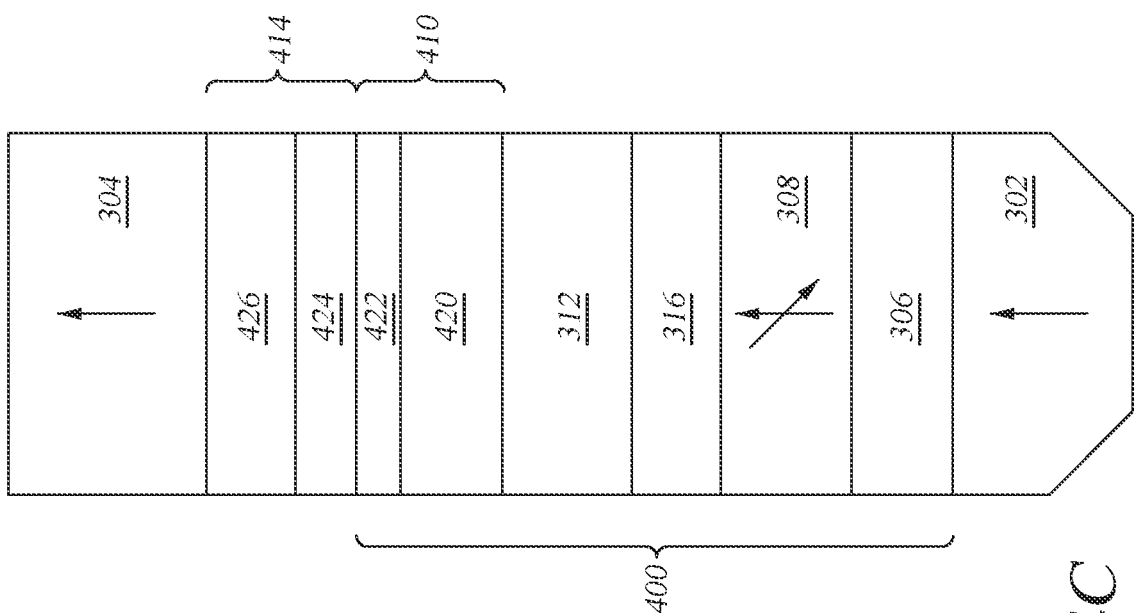

SPIN TORQUE OSCILLATOR WITH ENHANCED SPIN POLARIZER

BACKGROUND OF THE DISCLOSURE

Field of the Disclosure

Embodiments of the present disclosure generally relate to a magnetic recording head comprising a spin torque oscillator (STO), such as a write head of a data storage device, for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 $Tbit/in^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface (MFS). As the main pole becomes smaller, the writing field becomes smaller as well, limiting the effectiveness of the magnetic write head.

Heat-assisted magnetic recording (HAMR) and microwave-assisted magnetic recording (MAMR) are two types of energy-assisted recording technology to improve the recording density of a magnetic recording medium, such as a HDD. In MAMR, a spin torque oscillator (STO) device is located next to or near the write element such that in operation the STO enhances the write field of the write pole. In addition, the STO produces a high-frequency AC field, such as in a microwave frequency band, that reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

Energy-assisted recording write heads may require an undesirable high voltage and/or an undesirable high current to produce a write field enhancement. A high voltage and/or high current may impact the lifetime and the reliability of the write head by degrading components of the write head. Lowering the bias voltage or current, or lowering the moment-thickness product of the energy-assist magnetic layer that generates the enhanced write field, can hinder writer performance, lower areal density capability (ADC), and/or limit the materials used in write heads.

Therefore, there is a need for write heads that simply and effectively facilitate write head performance reliability while enhancing spin polarization.

SUMMARY OF THE DISCLOSURE

The present disclosure generally relates to a magnetic recording head comprising a spintronic device. The spintronic device is disposed between a main pole and a trailing shield of the magnetic recording head. The spintronic device comprises a multilayer spacer layer comprising a Cu layer in contact with a spin torque layer and a spin transparent texture layer disposed on the Cu layer, the spin transparent texture layer comprising AgSn or AgZn. A multilayer notch comprising a CoFe layer is disposed over the spin transparent texture layer of the multilayer spacer layer and a Heusler alloy layer is disposed on the CoFe layer, the Heusler alloy layer comprising CoMnGe, CoFeGe, or CoFeMnGe. The multilayer spacer layer and the multilayer notch result in the spintronic device having a high spin polarization and a reduced critical current.

In one embodiment, a magnetic recording head comprises a main pole and a spintronic device disposed on the main pole, the spintronic device comprising: a spin torque layer, and a multilayer spacer layer disposed over the spin torque layer, the multilayer spacer layer comprising a Cu layer and a spin transparent texture layer, and a trailing shield disposed on the spintronic device, the trailing shield comprising: a multilayer notch disposed on the multilayer spacer layer, the multilayer notch comprising a CoFe layer and a Heusler alloy layer.

In another embodiment, a magnetic recording head comprises a main pole and a spintronic device disposed on the main pole, the spintronic device comprising: a spin torque layer, a Cu layer disposed over the spin torque layer, and a spin transparent texture layer disposed on the Cu layer, the spin transparent texture layer comprising AgSn or AgZn, and a trailing shield disposed on the spintronic device, the trailing shield comprising: a CoFe layer disposed over the spin transparent texture layer, and a Heusler alloy layer disposed on the CoFe layer, the Heusler alloy layer comprising CoMnGe, CoFeGe, or CoFeMnGe.

In yet another embodiment, a magnetic recording head comprises a main pole and a spintronic device disposed on the main pole, the spintronic device comprising: a seed layer disposed on the main pole, a spin torque layer disposed on the seed layer, and a first multilayer spacer layer disposed over the spin torque layer, the first multilayer spacer layer comprising a Cu layer disposed over the spin torque layer and a spin transparent texture layer disposed on the Cu layer, the spin transparent texture layer comprising AgSn or AgZn, wherein the Cu layer has a greater thickness than the spin transparent texture layer, and a trailing shield disposed on the spintronic device, the trailing shield comprising: a multilayer notch disposed over the first multilayer spacer layer, the multilayer notch comprising a CoFe layer and a Heusler alloy layer disposed on the CoFe layer, the Heusler alloy layer comprising CoMnGe, CoFeGe, or CoFeMnGe, wherein the Heusler alloy layer has a greater thickness than the CoFe layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4C illustrates a spintronic device incorporating the multilayer spacer layer and the multilayer notch of FIGS. 4A-4B, according to one embodiment.

FIG. 4D illustrates a spintronic device incorporating the multilayer spacer layer and the multilayer notch of FIGS. 4A-4B, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head comprising a spintronic device. The spintronic device is disposed between a main pole and a trailing shield of the magnetic recording head. The spintronic device comprises a multilayer spacer layer comprising a Cu layer in contact with a spin torque layer and a spin transparent texture layer disposed on the Cu layer, the spin transparent texture layer comprising AgSn or AgZn. A multilayer notch comprising a CoFe layer is disposed over the spin transparent texture layer of the multilayer spacer layer and a Heusler alloy layer is disposed on the CoFe layer, the Heusler alloy layer comprising CoMnGe, CoFeGe, or CoFeMnGe. The multilayer spacer layer and the multilayer notch result in the spintronic device having a high spin polarization and a reduced critical current.

Figure 1:
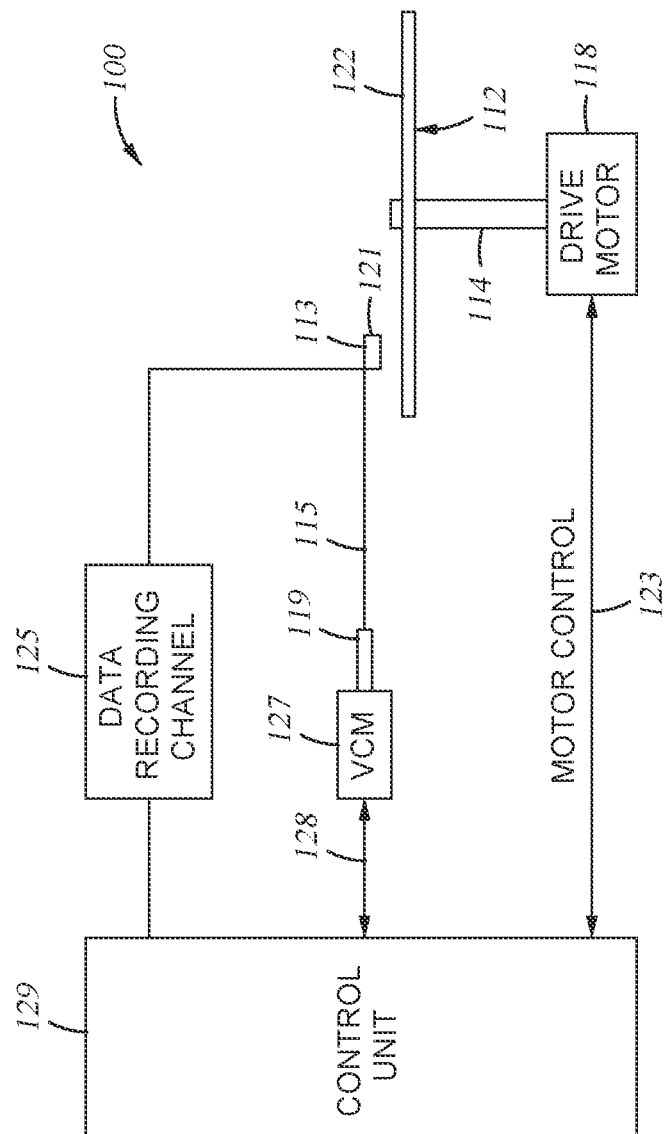
FIG. 1 is a schematic illustration of a magnetic recording device, according to one implementation.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
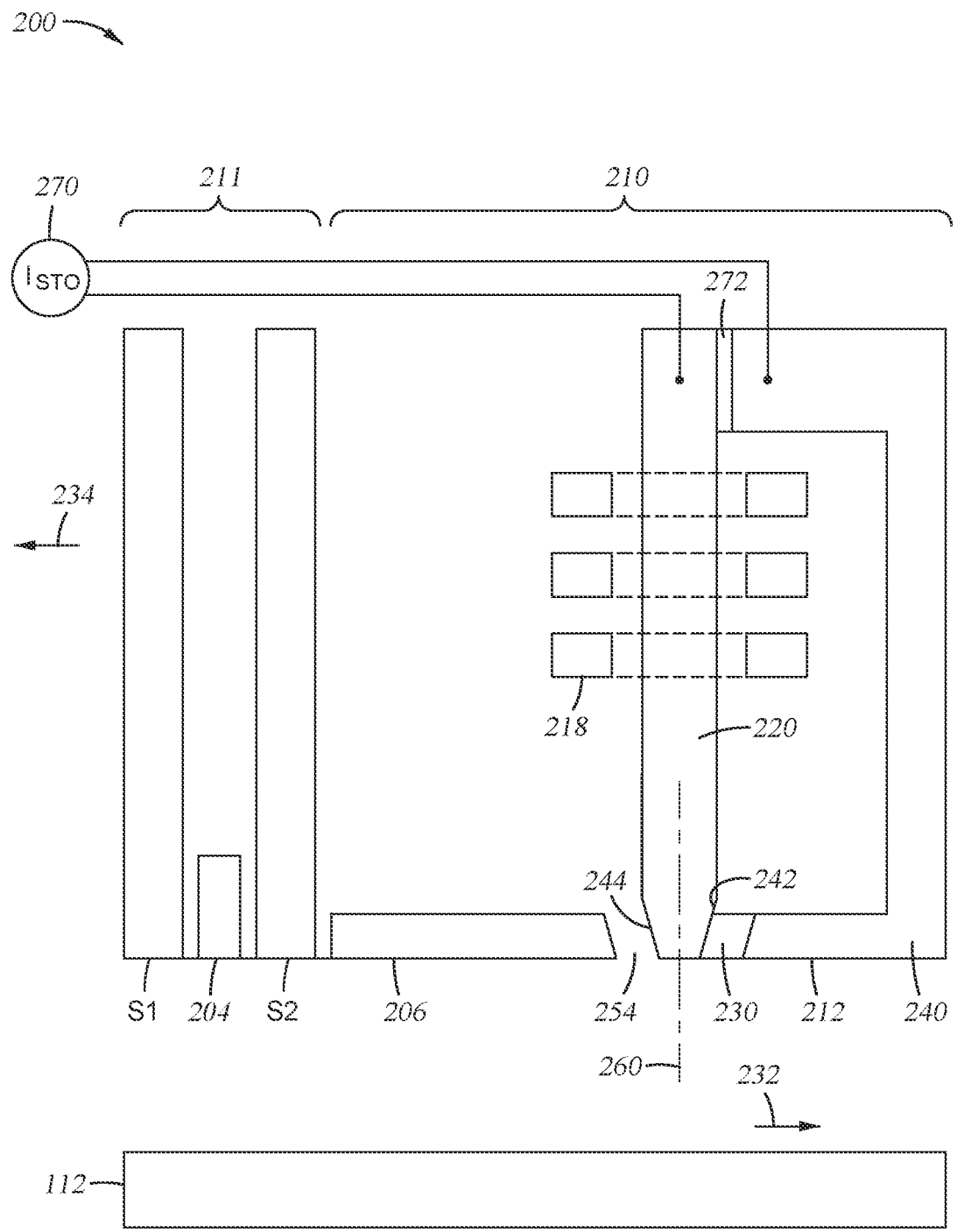
FIG. 2 is a schematic illustration of a cross sectional side view of a head assembly facing the magnetic disk shown in FIG. 1 or other magnetic storage medium, according to one implementation.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magnetoresistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3A:
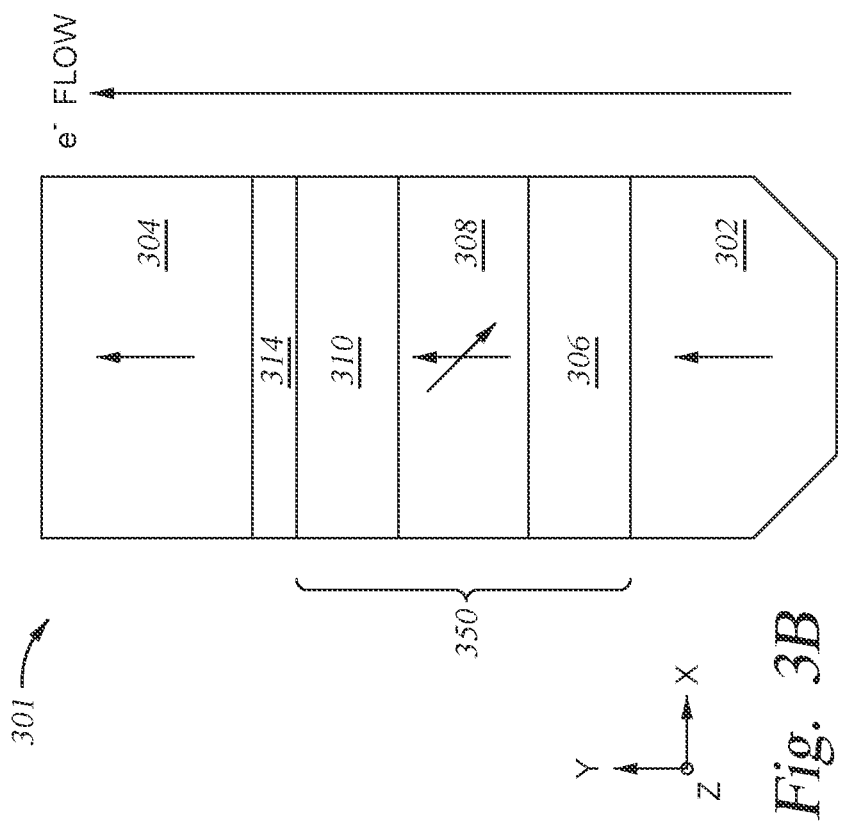
FIGS. 3A-3B illustrate media facing surface (MFS) views of spintronic devices, disposed between a main pole and a trailing shield of a magnetic recording head, according to various embodiments.
Figure 3B:
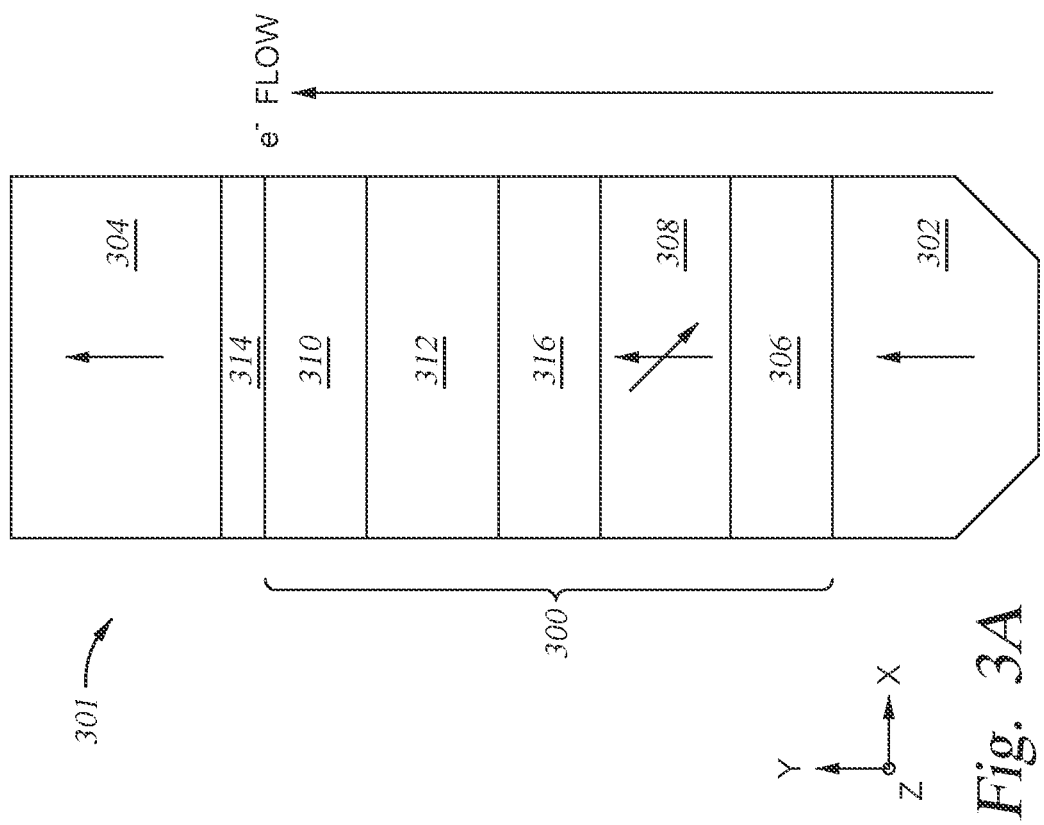

FIGS. 3A-3B illustrate media facing surface (MFS) views of spintronic devices 300, 350, respectively, disposed between a main pole 302 and a trailing shield 304 of a magnetic recording head 301, according to various embodiments. Each of the spintronic devices 300, 350 may independently be a STO, and as such, may be referred to herein as STO 300 and STO 350. Both the STO 300 and the STO 350 may independently be utilized in the magnetic recording device 100, such as in the head assembly 121. Both the STO 300 and the STO 350 may independently be the spintronic device 230 of FIG. 2, the main pole 302 may be the main pole 220 of FIG. 2, and the trailing shield 304 may be the TS 240 of FIG. 2.

In FIG. 3A, the STO 300 comprises a seed layer 306 disposed on the main pole 302, a spin torque layer (STL) 308 disposed on the seed layer 306, a first spacer layer 316 disposed on the STL 308, a field generation layer (FGL) 312 disposed on the first spacer layer 316, and a second spacer layer 310 disposed on the FGL 312. As shown in FIG. 3A, the trailing shield 304 may optionally comprise a notch 314 disposed in contact with the FGL 312. In some embodiments, the notch 314 may be referred to as a cap layer. In other embodiments, a cap layer (not shown) may be disposed on the notch 314. For example, the cap layer may comprise CoFe70, Ru, or a combination thereof.

The spintronic device 350 of FIG. 3B is the same as the spintronic device 300 of FIG. 3A; however the spintronic device 350 does not comprise a FGL or the first spacer layer 316. Rather, the spacer layer 316 is disposed in contact with the trailing shield 304 or the notch 314 of the trailing shield 304 instead.

The seed layer 306 may comprise NiFeTa, Ru, NiAl, or a combination thereof, and has a thickness in the y-direction of about 3 nm to about 10 nm, such as about 7 nm. The STL 308 comprises CoFe, NiFe, CoFe, or a combination thereof, and has a thickness in the y-direction of about 5 nm to about 8 nm, such as about 6.5 nm. The first and second spacer layers 310, 316 may each individually be a multilayer structure and comprise Cu, Ag, AgSn, AgZn, or a combination thereof, as discussed below in FIGS. 4A-4E. The notch 314 comprises a Heusler alloy, such as CoFeMnGe with a half-metallic ordered phase having high spin polarization. For example, the notch 314 may be a multilayer structure and comprise CoFe, CoFeMnGe, or a combination thereof, as discussed below in FIGS. 4A-4E. The FGL 312 may comprise a multilayer structure containing Co, Fe, and CoFe layers having a thickness in the y-direction of about 5 nm to about 10 nm. The trailing shield 304 may comprise CoFe.

When an electric current is applied, the electrons may flow from the main pole 302 through the STO 300, or the STO 350, to the trailing shield 304 in the y-direction, as shown by the arrow labeled e-flow. Polarized electrons from the main pole 302 are scattered by the seed layer 306, resulting in less polarization which reduces the direct spin torque on the STL 308. Electrons that are reflected by the trailing shield 304 become polarized, which then pass back through the spacer layer 310 and the spin torque flips the magnetization of the STL 308. Higher polarization of the trailing shield 304 produces more spin torque on the STL 308 and decreases the critical switching current (Jc).

Heusler alloys, such as the Heusler alloy of the notch 314, generally require a large thickness in the y-direction and high deposition temperatures or post-deposition high temperature annealing for ordered growth with highest spin polarization. However, if annealing temperatures exceed about 220° C., the read head, such as the magnetic read head 211 of FIG. 2, can be negatively impacted. Furthermore, Heusler alloys have a lower magnetic moment compared to CoFe or other materials used for trailing shields 304, which can degrade base writing properties of the write head, such as the write head 210 of FIG. 2. As such, it may be necessary to limit the thickness of the Heusler alloy insertion in the notch 314 so as to avoid or limit degradation of the writing properties of the magnetic recording head. By utilizing multilayer structures for the spacer layer 310 and the notch 314, like described in FIGS. 4A-4E below, the above issues can be negated or overcome.

Figure 4B:
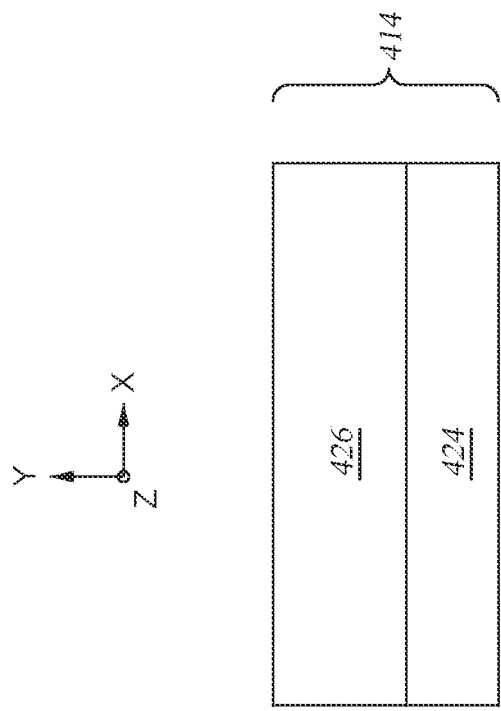
FIG. 4B illustrates a multilayer notch to be utilized in a spintronic device, according to one embodiment.
Figure 4A:
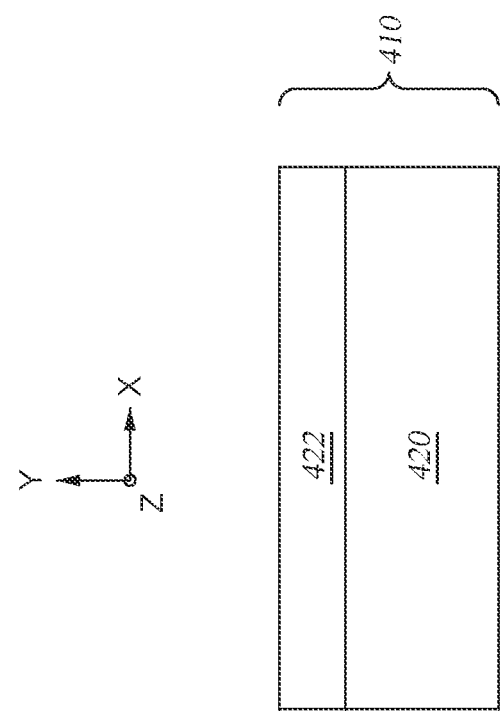
FIG. 4A illustrates a multilayer spacer layer to be utilized in a spintronic device, according to one embodiment.
Figure 4E:
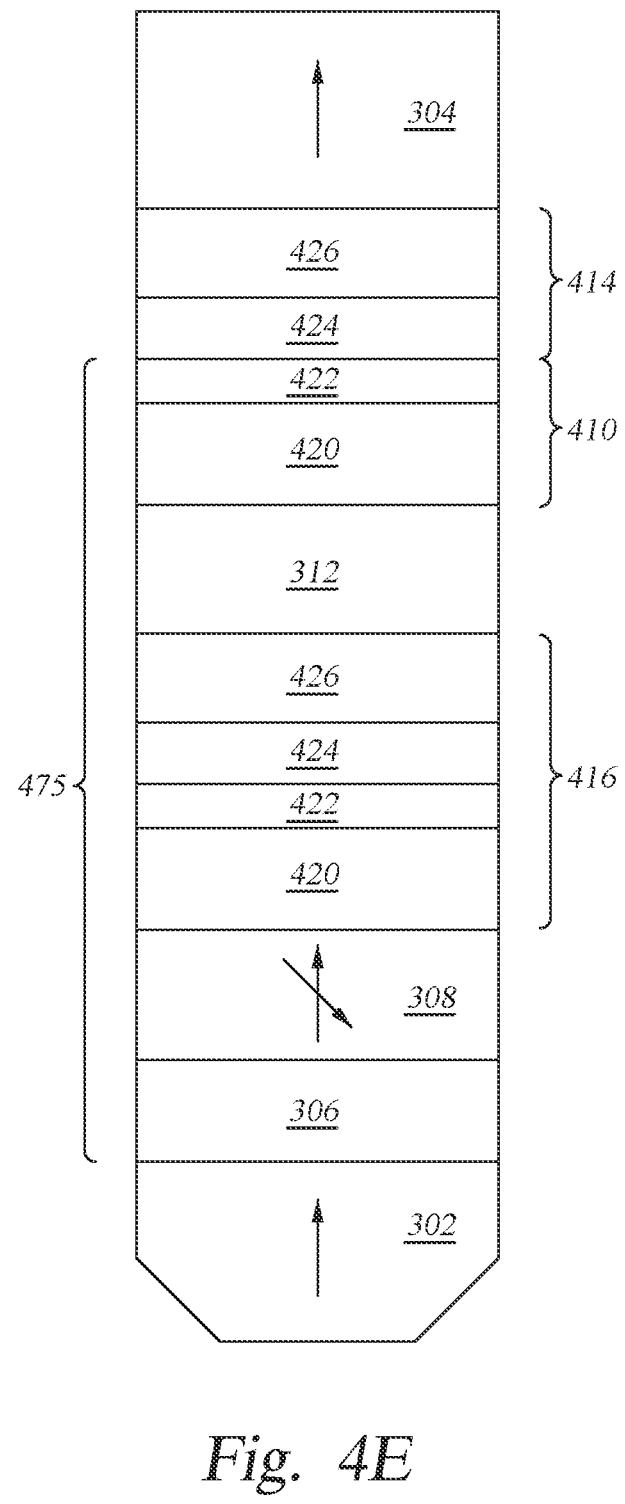
FIG. 4E illustrates a spintronic device incorporating a first multilayer spacer layer, a second multilayer spacer layer, and a multilayer notch of FIGS. 4A-4B, according to yet another embodiment.

FIG. 4A illustrates a multilayer spacer layer 410 to be utilized in a spintronic device or STO, according to one embodiment. FIG. 4B illustrates a multilayer notch 414 to be utilized in a spintronic device or STO, according to one embodiment. The multilayer spacer layer 410 and the multilayer spacer notch 414 of FIGS. 4A-4B may be used in combination with one another, as shown in FIGS. 4C-4E. FIG. 4C illustrates a spintronic device or STO 400 incorporating the multilayer spacer layer 410 and the multilayer notch 414 of FIGS. 4A-4B, according to one embodiment. FIG. 4D illustrates a spintronic device or STO 450 incorporating the multilayer spacer layer 410 and the multilayer notch 414 of FIGS. 4A-4B, according to another embodiment. FIG. 4E illustrates a spintronic device or STO 475 incorporating a first multilayer spacer layer 416, a second multilayer spacer layer 410, and the multilayer notch 414 of FIGS. 4A-4B, according to another embodiment.

The STO 400 and the STO 475 may each be the STO 300 of FIG. 3A, and the STO 450 may be the STO 350 of FIG. 3B. The multilayer spacer layer 410 may be the spacer layer 310 of FIGS. 3A-3B, the multilayer spacer layer 416 may be the spacer layer 316 of FIGS. 3A-3B, and the multilayer notch 414 may be the notch 314 of FIGS. 3A-3B. In some embodiments, the multilayer notch 414 may be referred to as a cap layer. In other embodiments, a cap layer (not shown) may be disposed on the notch 414. The cap layer may be a sacrificial layer that is removed during subsequent processing steps, like discussed below in FIGS. 5A-5D.

The multilayer spacer layer 410 of FIG. 4A comprises a first layer 420 and a second layer 422 disposed on the first layer 420. As shown in FIG. 4C, the first layer 420 is disposed in contact with the FGL 312 and the second layer 422 is disposed in contact with the notch 414. In FIG. 4D, the first layer 420 is disposed in contact with the STL 308 and the second layer 422 is disposed in contact with the notch 414. The first layer 420 comprises Cu or Al (which may be referred to herein as Cu layer 420) and has a thickness in the y-direction of about 2 nm to about 8 nm. The second layer 420 is a spin transparent texture layer that promotes ordered growth of a Heusler alloy that comprises AgSn or AgZn (which may be referred to herein as spin transparent texture layer 422) and has a thickness in the y-direction of about 0.5 nm to about 1 nm, such as about 0.8 nm. The second layer 420 may comprise 1 to 3 thin monolayers of AgSn or AgZn, each monolayer having a thickness in the y-direction of about 0.2 nm to about 0.3 nm.

The multilayer notch 414 of FIG. 4B comprises a first layer 424 and a second layer 426 disposed on the first layer 424. As shown in FIG. 4C, the first layer 424 is disposed in contact with the second layer 422 of the spacer layer 410 and the second layer 426 is disposed in contact with the trailing shield 304. In FIG. 4D, the first layer 424 is disposed in contact with the second layer 422 of the spacer layer 410 and the second layer 426 is disposed in contact with the trailing shield 304. The first layer 424 comprises CoFe (which may be referred to herein as CoFe layer 424) and has a thickness in the y-direction of about 0.5 nm to about 1.5 nm, such as about 1 nm. The second layer 426 comprises a Heusler alloy such as CoMnGe, CoFeGe, or CoFeMnGe (which may be referred to herein as CoFeMnGe layer 426 or a Heusler alloy layer 426) and has a thickness in the y-direction of about 1.5 nm to about 3.5 nm, such as about 2 nm to about 3 nm.

FIG. 4E is similar to FIG. 4C; however, the first spacer layer 316 is a first multilayer spacer layer 416 that comprises the first layer 420 (e.g., the Cu layer 420) and the second layer 422 (e.g., the spin transparent texture layer 422) of the first multilayer spacer 410 as well as the first layer 424 (e.g., the CoFe layer 424) and the second layer 426 (e.g., the Heusler alloy layer 426) of the multilayer notch 414. In the STO 475 of FIG. 4E, the Cu layer 420 of the spacer layer 416 is disposed in contact with the STL 308, the spin transparent texture layer 422 is disposed in contact with the Cu layer 420, the CoFe layer 424 is disposed in contact with the spin transparent texture layer 422, and the Heusler alloy layer 426 is disposed in contact with the CoFe layer 424 and the FGL 312. FIG. 4E still comprises the second multilayer spacer layer 410 and the multilayer notch 414, like FIG. 4C.

By utilizing the multilayer spacer layer 410 and the multilayer notch 414 of FIGS. 4A-4B in the STOs 400, 450, 475, the STOs 400, 450, 475 can achieve a high spin polarization and reduce the critical current through the STOs 400, 450, 475 even when annealed at only modestly high temperatures, such as about 220° C. Furthermore, the second layer 422 comprising AgSn or AgZn of the spacer layer 410 promotes the desired microstructure of the Heusler alloy utilized in the notch 414 in addition to the high polarization, as AgSn or AgZn has a better crystal structure for Heusler alloy growing as compared to Cu.

Figure 5A:
FIG. 5A illustrates a chart comparing four different spintronic devices, according to one embodiment.
Figure 5B:
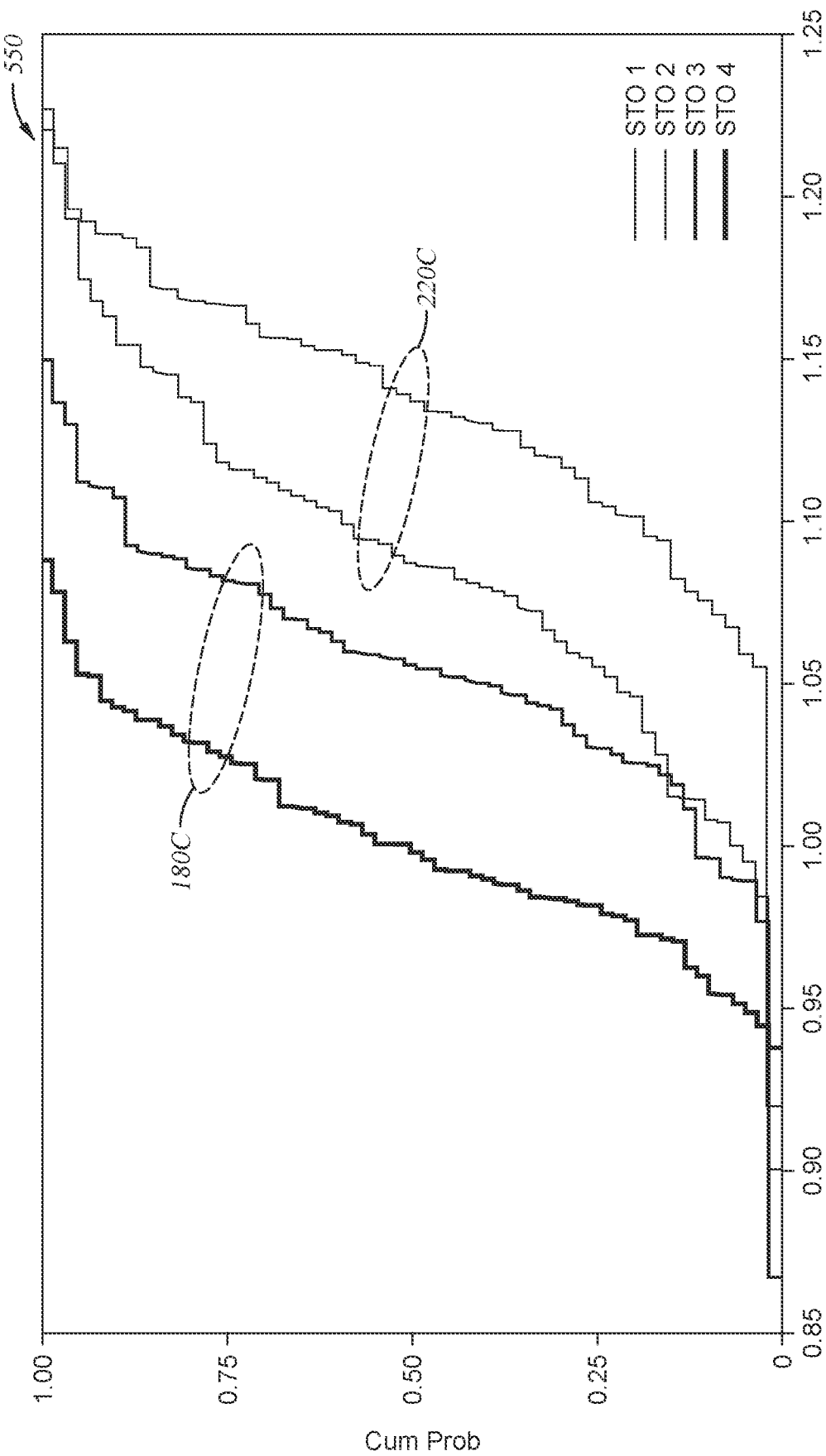
FIG. 5B illustrates a graph of cumulative probability versus normalized delta spin polarization (deIRA) for each spintronic device shown in the chart of FIG. 5A.
Figure 5C:
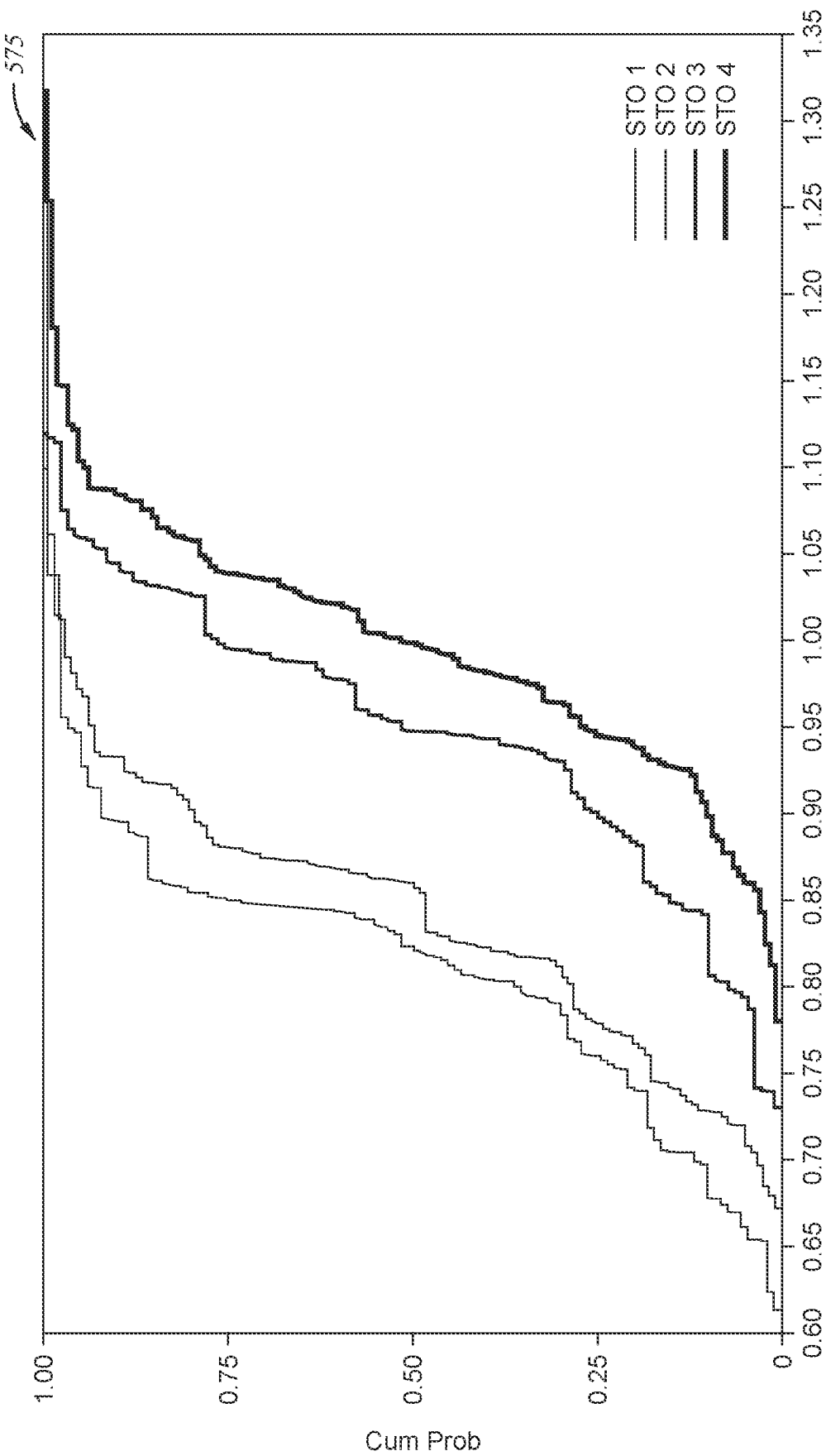
FIG. 5C illustrates a graph of cumulative probability versus normalized critical current (Jc) for each spintronic device shown in the chart of FIG. 5A.
Figure 5D:
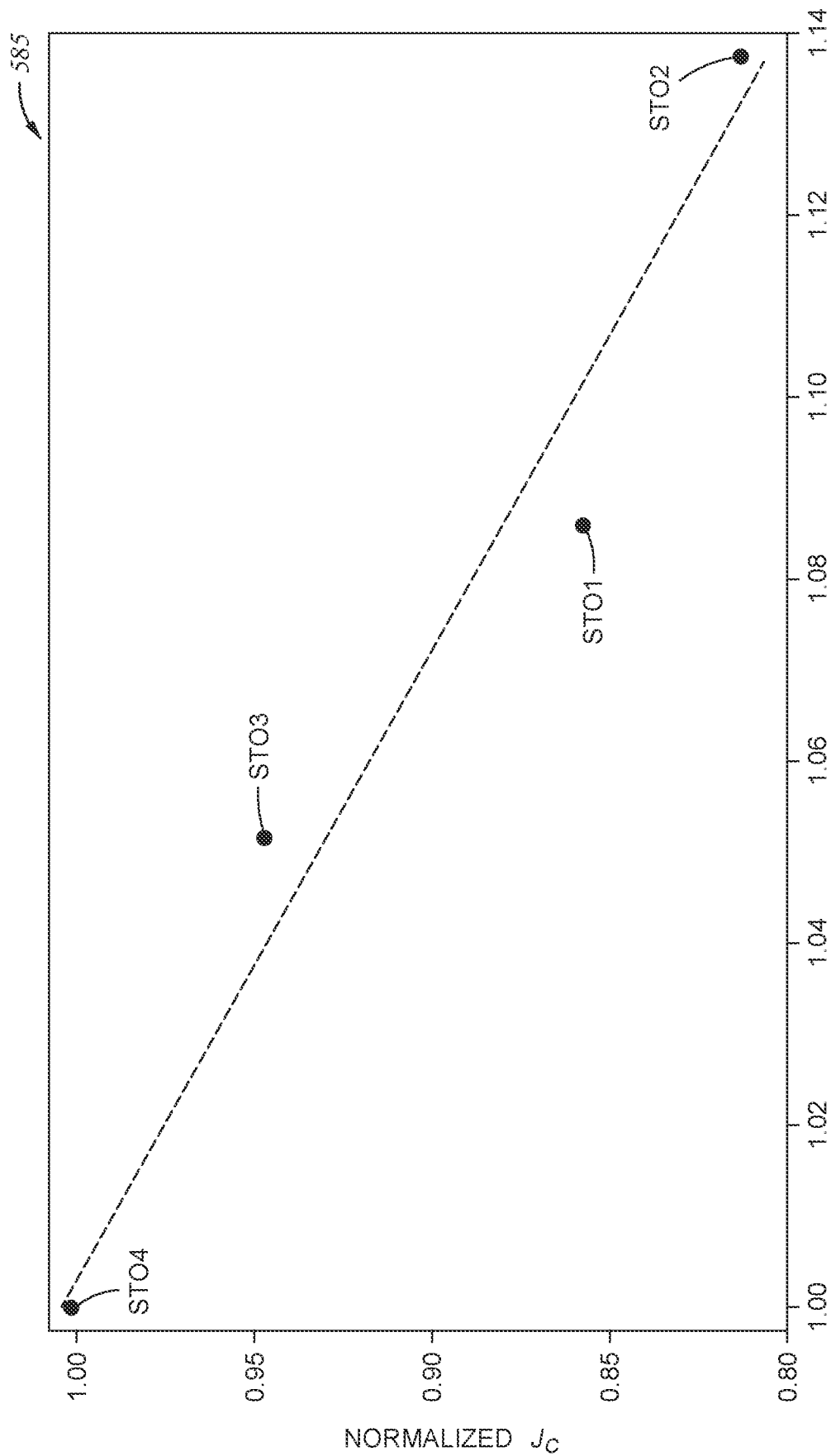
FIG. 5D illustrates a graph showing the correlation between normalized critical current (Jc) and normalized delta spin polarization (deIRA), according to one embodiment.

FIGS. 5A-5D illustrate charts and/or graphs comparing four different STOs, STO 1, STO 2, STO 3, and STO 4, according to various embodiments. FIG. 5A illustrates a chart 500 showing the materials of the spacer layers and notches utilized in each STO 1-4. FIG. 5B illustrates a graph 550 of cumulative probability versus normalized delta spin polarization (deIRA) for each STO 1-4 shown in the chart 500 of FIG. 5A. FIG. 5C illustrates a graph 575 of cumulative probability versus normalized critical current (Jc) for each STO 1-4 shown in the chart 500 of FIG. 5A. FIG. 5D illustrates a graph 585 showing the correlation between normalized critical current (Jc) and normalized delta spin polarization (deIRA), according to one embodiment.

Each STO 1-4 comprises a seed layer comprising NiFeTa, Ru, NiAl, or a combination thereof, having a thickness in the y-direction of about 3 nm to about 10 nm, such as about 7 nm, and a STL comprising CoFe, NiFe, CoFe, or a combination thereof, having a thickness in the y-direction of about 5 nm to about 8 nm, such as about 6.5 nm.

STO 1 further comprises a spacer layer comprising Cu having a thickness in the y-direction of about 3 nm, and a multilayer notch comprising CoFe/CoMnFeGe having a thickness in the y-direction of about 3.5 nm, like shown in FIG. 4B (the notation "I" is used in this disclosure to denote separation in a multi-layer stack). The cap layer is a sacrificial layer that is removed during subsequent processing steps. STO 1 is annealed at a temperature of about 220° C.

STO 2 further comprises the multilayer spacer layer 410 of FIG. 4A comprising Cu/AgSn having a thickness in the y-direction of about 3 nm, and the multilayer notch 414 of FIG. 4B comprising CoFe/CoMnFeGe having a thickness in the y-direction of about 3.5 nm. The cap layer is a sacrificial layer that is removed during subsequent processing steps. STO 2 is annealed at a temperature of about 220° C.

STO 3 further comprises the multilayer spacer layer 410 of FIG. 4A comprising Cu/AgSn having a thickness in the y-direction of about 3 nm, and the multilayer notch 414 of FIG. 4B comprising CoFe/CoMnFeGe having a thickness in the y-direction of about 3.5 nm. The cap layer is a sacrificial layer that is removed during subsequent processing steps. STO 3 is annealed at a temperature of about 180° C.

STO 4 further comprises a spacer layer comprising Cu having a thickness in the y-direction of about 3 nm, and a notch comprising CoFe70 having a thickness in the y-direction of about 14 nm. The cap layer is a sacrificial layer that is removed during subsequent processing steps. STO 4 is annealed at a temperature of about 180° C.

As shown in the chart 500 of FIG. 5A and the graph 550 of FIG. 5B, STO 2 comprising the multilayer spacer layer 410 of FIG. 4A and the multilayer notch 414 of FIG. 4B has a higher delta spin polarization (deIRA) compared to STO 1 when STO 1 and STO 2 are both annealed at a temperature of about 220° C., and STO 3 comprising the multilayer spacer layer 410 of FIG. 4A and the multilayer notch 414 of FIG. 4B has a higher delta spin polarization (deIRA) compared to STO 4 when STO 3 and STO 4 are both annealed at a temperature of about 180° C. Thus, utilizing the multilayer spacer layer 410 of FIG. 4A and the multilayer notch 414 of FIG. 4B in an STO results in the STO having a higher delta spin polarization (deIRA) compared to STOs that do not comprise the multilayer spacer layer 410 of FIG. 4A and the multilayer notch 414 of FIG. 4B.

As shown in the chart 500 of FIG. 5A and the graph 575 of FIG. 5C, STO 2 comprising the multilayer spacer layer 410 of FIG. 4A and the multilayer notch 414 of FIG. 4B has a lower critical current (Jc) compared to STO 1 when STO 1 and STO 2 are both annealed at a temperature of about 220° C., and STO 3 comprising the multilayer spacer layer 410 of FIG. 4A and the multilayer notch 414 of FIG. 4B has a lower critical current (Jc) compared to STO 4 when STO 3 and STO 4 are both annealed at a temperature of about 180° C. Thus, utilizing the multilayer spacer layer 410 of FIG. 4A and the multilayer notch 414 of FIG. 4B in an STO results in the STO having a lower critical current (Jc) compared to STOs that do not comprise the multilayer spacer layer 410 of FIG. 4A and the multilayer notch 414 of FIG. 4B.

The graph 585 of FIG. 5D illustrates the correlation between reduced critical current (Jc) to an increased delta spin polarization (deIRA). STOs comprising the multilayer spacer layer 410 of FIG. 4A and the multilayer notch 414 of FIG. 4B, such as the STO 400, the STO 450, and the STO 475 of FIGS. 4C-4E, can achieve a critical current up to about 18% lower than STOs that do not comprise the multilayer spacer layer 410 of FIG. 4A and the multilayer notch 414 of FIG. 4B while still achieving high spin polarization.

By utilizing the multilayer spacer layer comprising Cu/AgSn or Cu/AgZn and the multilayer notch comprising CoFe/CoFeMnGe (or CoFe/CoMnGe, or CoFe/CoFeGe) in a spintronic device, the spintronic device can achieve a high spin polarization while the critical current through the spintronic device is reduced, even when the spintronic device is annealed at high temperatures, such as about 220° C., without degrading the writing properties of the magnetic recording head. Furthermore, the AgSn or AgZn of the multilayer spacer layer promotes a desired microstructure of the Heusler alloys utilized in the spintronic device, such as within the multilayer notch, in addition to the high polarization, as AgSn (or AgZn) has a better crystal structure for Heusler alloy growing as compared to Cu. As such, the multilayer spacer layer comprising Cu/AgSn (or Cu/AgZn) and the multilayer notch comprising CoFe/CoFeMnGe (or CoFe/CoMnGe, or CoFe/CoFeGe) enhance spin polarization within an spintronic device while the critical current.

In one embodiment, a magnetic recording head comprises a main pole and a spintronic device disposed on the main pole, the spintronic device comprising: a spin torque layer, a spacer layer disposed on the spin torque layer, and a multilayer spacer layer disposed over the spin torque layer, the multilayer spacer layer comprising a Cu layer and a spin transparent texture layer, and a trailing shield disposed on the spintronic device, the trailing shield comprising: a multilayer notch disposed on the multilayer spacer layer, the multilayer notch comprising a CoFe layer and a Heusler alloy layer.

The Cu layer has a thickness of about 2 nm to about 8 nm. The spin transparent texture layer comprises AgSn or AgZn, and the spin transparent texture layer has a thickness of about 0.5 nm to about 1.0 nm. The CoFe layer has a thickness of about 0.5 nm to about 1.5 nm. The Heusler alloy layer comprises CoMnGe, CoFeGe, or CoFeMnGe, and the Heusler alloy layer has a thickness of about 1.5 nm to about 3.5 nm. The CoFe layer is disposed on the spin transparent texture layer. The spintronic device further comprises a spacer layer disposed on the spin torque layer, and a field generation layer disposed on the spacer layer, the field generation layer being disposed in contact with the multilayer spacer layer. The spacer layer disposed on the spin torque layer is a second multilayer spacer layer comprising: a Cu layer disposed on the spin torque layer, a spin transparent texture layer disposed on the Cu layer, the spin transparent texture layer comprising AgSn or AgZn, a CoFe layer disposed on the spin transparent texture layer, and a Heusler alloy layer disposed on the CoFe layer, the Heusler alloy layer being in contact with the field generation layer, the Heusler alloy layer comprising CoMnGe, CoFeGe, or CoFeMnGe. The Cu layer is disposed on the field generation layer, the spin transparent texture layer is disposed on the Cu layer, and the Heusler alloy layer is disposed on the CoFe layer. A magnetic recording device comprises the magnetic recording head.

In another embodiment, a magnetic recording head comprises a main pole and a spintronic device disposed on the main pole, the spintronic device comprising: a spin torque layer, a Cu layer disposed over the spin torque layer, and a spin transparent texture layer disposed on the Cu layer, the spin transparent texture layer comprising AgSn or AgZn, and a trailing shield disposed on the spintronic device, the trailing shield comprising: a CoFe layer disposed over the spin transparent texture layer, and a Heusler alloy layer disposed on the CoFe layer, the Heusler alloy layer comprising CoMnGe, CoFeGe, or CoFeMnGe.

The Cu layer has a thickness of about 2 nm to about 8 nm, and the spin transparent texture layer has a thickness of about 0.5 nm to about 1.0 nm. The CoFe layer has a thickness of about 0.5 nm to about 1.5 nm, and the Heusler alloy layer has a thickness of about 1.5 nm to about 3.5 nm. The CoFe layer is disposed on the spin transparent texture layer. The spintronic device further comprises a field generation layer disposed between and in contact with the Cu layer and the spin torque layer, and a spacer layer disposed between and in contact with the spin torque layer and the field generation layer. The spacer layer is a multilayer spacer layer comprising: a Cu layer disposed on the spin torque layer, a spin transparent texture layer disposed on the Cu layer, the spin transparent texture layer comprising AgSn or AgZn, a CoFe layer disposed on the spin transparent texture layer, and a Heusler alloy layer disposed on the CoFe layer, the Heusler alloy layer being in contact with the field generation layer, the Heusler alloy layer comprising CoMnGe, CoFeGe, or CoFeMnGe. The Cu layer has a greater thickness than the Heusler alloy layer, the Heusler alloy layer has a greater thickness than the CoFe layer, and the CoFe layer has a greater thickness than the spin transparent texture layer. A magnetic recording device comprises the magnetic recording head.

In yet another embodiment, a magnetic recording head comprises a main pole and a spintronic device disposed on the main pole, the spintronic device comprising: a seed layer disposed on the main pole, a spin torque layer disposed on the seed layer, and a first multilayer spacer layer disposed over the spin torque layer, the first multilayer spacer layer comprising a Cu layer disposed over the spin torque layer and a spin transparent texture layer disposed on the Cu layer, the spin transparent texture layer comprising AgSn or AgZn, wherein the Cu layer has a greater thickness than the AgSn layer, and a trailing shield disposed on the spintronic device, the trailing shield comprising: a multilayer notch disposed over the first multilayer spacer layer, the multilayer notch comprising a CoFe layer and a Heusler alloy layer disposed on the CoFe layer, the Heusler alloy layer comprising CoMnGe, CoFeGe, or CoFeMnGe, wherein the Heusler alloy layer has a greater thickness than the CoFe layer.

The spintronic device further comprises a field generation layer disposed between the first multilayer spacer layer and the spin torque layer, and a second multilayer spacer layer disposed between the spin torque layer and the field generation layer. The second multilayer spacer layer comprises a Cu layer disposed on the spin torque layer, a spin transparent texture layer disposed on the Cu layer, the spin transparent texture layer comprising AgSn or AgZn, a CoFe layer disposed on the spin transparent texture layer, and a Heusler alloy layer disposed on the CoFe layer, the Heusler alloy layer comprising CoMnGe, CoFeGe, or CoFeMnGe. The CoFe layer has a greater thickness than the spin transparent texture layer, and the Cu layer has a greater thickness than the Heusler alloy layer. The Cu layer has a thickness of about 2 nm to about 8 nm, the spin transparent texture layer has a thickness of about 0.5 nm to about 1.0 nm, the CoFe layer has a thickness of about 0.5 nm to about 1.5 nm, and the Heusler alloy layer has a thickness of about 1.5 nm to about 3.5 nm. A magnetic recording device comprises the magnetic recording head While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
    a main pole;
    a spintronic device disposed on the main pole, the spintronic device comprising:
        a spin torque layer; and
        a multilayer spacer layer disposed over the spin torque layer, the multilayer spacer layer comprising a Cu layer and a spin transparent texture layer; and
    a trailing shield disposed on the spintronic device, the trailing shield comprising a multilayer notch disposed on the multilayer spacer layer, the multilayer notch comprising a CoFe layer and a Heusler alloy layer, wherein the Cu layer has a greater thickness than the Heusler alloy layer, the Heusler alloy layer has a greater thickness than the CoFe layer, and the CoFe layer has a greater thickness than the spin transparent texture layer.

2. The magnetic recording head of claim 1, wherein the Cu layer has a thickness of about 2 nm to about 8 nm.

3. The magnetic recording head of claim 1, wherein the spin transparent texture layer comprises AgSn or AgZn, and wherein the spin transparent texture layer has a thickness of about 0.5 nm to about 1.0 nm.

4. The magnetic recording head of claim 1, wherein the CoFe layer has a thickness of about 0.5 nm to about 1.5 nm.

5. The magnetic recording head of claim 1, wherein the Heusler alloy layer comprises CoMnGe, CoFeGe, or CoFeMnGe, and wherein the Heusler alloy layer has a thickness of about 1.5 nm to about 3.5 nm.

6. The magnetic recording head of claim 1, wherein the CoFe layer is disposed on the spin transparent texture layer.

7. The magnetic recording head of claim 1, wherein the spintronic device further comprises:
    a spacer layer disposed on the spin torque layer; and
    a field generation layer disposed on the spacer layer, the field generation layer being disposed in contact with the multilayer spacer layer.

8. The magnetic recording head of claim 7, wherein the spacer layer disposed on the spin torque layer is a second multilayer spacer layer comprising:
    a Cu layer disposed on the spin torque layer;
    a spin transparent texture layer disposed on the Cu layer of the second multilayer spacer layer, the spin transparent texture layer of the second multilayer spacer layer comprising AgSn or AgZn;
    a CoFe layer disposed on the spin transparent texture layer of the second multilayer spacer layer; and
    a Heusler alloy layer disposed on the CoFe layer of the second multilayer spacer layer, the Heusler alloy layer of the second multilayer spacer layer being in contact with the field generation layer, the Heusler alloy layer of the second multilayer spacer layer comprising CoMnGe, CoFeGe, or CoFeMnGe.

9. A magnetic recording device comprising the magnetic recording head of claim 1.

10. A magnetic recording head, comprising:
a main pole;
a spintronic device disposed on the main pole, the spintronic device comprising:
a spin torque layer;
a spacer layer disposed on the spin torque layer;
a multilayer spacer layer disposed over the spin torque layer, the multilayer spacer layer comprising a Cu layer and a spin transparent texture layer; and
a field generation layer disposed on the spacer layer, the field generation layer being disposed in contact with the multilayer spacer layer; and
a trailing shield disposed on the spintronic device, the trailing shield comprising a multilayer notch disposed on the multilayer spacer layer, the multilayer notch comprising a CoFe layer and a Heusler alloy layer, wherein the Cu layer is disposed on the field generation layer, wherein the spin transparent texture layer is disposed on the Cu layer, and wherein the Heusler alloy layer is disposed on the CoFe layer.

11. A magnetic recording head, comprising:
a main pole;
a spintronic device disposed on the main pole, the spintronic device comprising:
a spin torque layer;
a Cu layer disposed over the spin torque layer; and
a spin transparent texture layer disposed on the Cu layer, the spin transparent texture layer comprising AgSn or AgZn; and
a trailing shield disposed on the spintronic device, the trailing shield comprising:
a CoFe layer disposed over the spin transparent texture layer; and
a Heusler alloy layer disposed on the CoFe layer, the Heusler alloy layer comprising CoMnGe, CoFeGe, or CoFeMnGe, wherein the Cu layer has a greater thickness than the Heusler alloy layer, the Heusler alloy layer has a greater thickness than the CoFe layer, and the CoFe layer has a greater thickness than the spin transparent texture layer.

12. The magnetic recording head of claim 11, wherein the Cu layer has a thickness of about 2 nm to about 8 nm, and wherein the spin transparent texture layer has a thickness of about 0.5 nm to about 1.0 nm.

13. The magnetic recording head of claim 11, wherein the CoFe layer has a thickness of about 0.5 nm to about 1.5 nm, and wherein the Heusler alloy layer has a thickness of about 1.5 nm to about 3.5 nm.

14. The magnetic recording head of claim 11, wherein the CoFe layer is disposed on the spin transparent texture layer.

15. The magnetic recording head of claim 11, wherein the spintronic device further comprises a field generation layer disposed between the Cu layer and the spin torque layer, and a spacer layer disposed between the spin torque layer and the field generation layer.

16. The magnetic recording head of claim 15, wherein the spacer layer is a multilayer spacer layer comprising:
a Cu layer disposed on the spin torque layer;
a spin transparent texture layer disposed on the Cu layer of the multilayer spacer layer, the spin transparent texture layer of the multilayer spacer layer comprising AgSn or AgZn;
a CoFe layer disposed on the spin transparent texture layer of the multilayer spacer layer; and
a Heusler alloy layer disposed on the CoFe layer of the multilayer spacer layer, the Heusler alloy layer of the multilayer spacer layer being in contact with the field generation layer, the Heusler alloy layer of the multilayer spacer layer comprising CoMnGe, CoFeGe, or CoFeMnGe.

17. A magnetic recording device comprising the magnetic recording head of claim 11.

18. A magnetic recording head, comprising:
a main pole;
a spintronic device disposed on the main pole, the spintronic device comprising:
a seed layer disposed on the main pole;
a spin torque layer disposed on the seed layer; and
a first multilayer spacer layer disposed over the spin torque layer, the multilayer spacer layer comprising a Cu layer disposed over the spin torque layer and a spin transparent texture layer disposed on the Cu layer, the spin transparent texture layer comprising AgSn or AgZn, wherein the Cu layer has a greater thickness than the spin transparent texture layer; and
a trailing shield disposed on the spintronic device, the trailing shield comprising:
a multilayer notch disposed over the first multilayer spacer layer, the multilayer notch comprising a CoFe layer and a Heusler alloy layer disposed on the CoFe layer, the Heusler alloy layer comprising CoMnGe, CoFeGe, or CoFeMnGe, wherein the Heusler alloy layer has a greater thickness than the CoFe layer.

19. The magnetic recording head of claim 18, wherein the spintronic device further comprises:
a field generation layer disposed between the first multilayer spacer layer and the spin torque layer; and
a second multilayer spacer layer disposed between the spin torque layer and the field generation layer, the second multilayer spacer layer comprising:
a Cu layer disposed on the spin torque layer;
a spin transparent texture layer disposed on the Cu layer of the second multilayer spacer layer, the spin transparent texture layer of the second multilayer spacer layer comprising AgSn or AgZn;
a CoFe layer disposed on the spin transparent texture layer of the second multilayer spacer layer; and
a Heusler alloy layer disposed on the CoFe layer of the second multilayer spacer layer, the Heusler alloy layer of the second multilayer spacer layer comprising CoMnGe, CoFeGe, or CoFeMnGe.

20. The magnetic recording head of claim 18, wherein the CoFe layer has a greater thickness than the spin transparent texture layer, and wherein the Cu layer has a greater thickness than the Heusler alloy layer.

21. The magnetic recording head of claim 18, wherein the Cu layer has a thickness of about 2 nm to about 8 nm, wherein the spin transparent texture layer has a thickness of about 0.5 nm to about 1.0 nm, wherein the CoFe layer has a thickness of about 0.5 nm to about 1.5 nm, and wherein the Heusler alloy layer has a thickness of about 1.5 nm to about 3.5 nm.

22. A magnetic recording device comprising the magnetic recording head of claim 18.

* * * * *